(12) United States Patent
Fields et al.

(10) Patent No.: US 10,490,078 B1
(45) Date of Patent: *Nov. 26, 2019

(54) TECHNOLOGY FOR PROVIDING REAL-TIME ROUTE SAFETY AND RISK FEEDBACK

(71) Applicant: STATE FARM MUTUAL AUTOMOBILE INSURANCE COMPANY, Bloomington, IL (US)

(72) Inventors: Brian Mark Fields, Normal, IL (US); Aaron Williams, Congerville, IL (US); Kristopher Keith Gaudin, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 124 days.

This patent is subject to a terminal disclaimer.

(21) Appl. No.: 15/655,404

(22) Filed: Jul. 20, 2017

(51) Int. Cl.
G08G 1/16 (2006.01)
G01C 21/34 (2006.01)
G01C 21/36 (2006.01)
H04L 29/08 (2006.01)

(52) U.S. Cl.
CPC .......... *G08G 1/16* (2013.01); *G01C 21/3492* (2013.01); *G01C 21/3661* (2013.01); *G01C 21/3691* (2013.01); *G01C 21/3611* (2013.01); *G01C 21/3629* (2013.01); *G01C 21/3652* (2013.01); *G01C 21/3667* (2013.01); *H04L 67/12* (2013.01)

(58) Field of Classification Search
None
See application file for complete search history.

(56) References Cited

U.S. PATENT DOCUMENTS

| | | | |
|---|---|---|---|
| 9,151,995 B2 * | 10/2015 | Tseng | G02F 1/134309 |
| 9,587,952 B1 * | 3/2017 | Slusar | G06Q 10/00 |
| 9,816,827 B1 * | 11/2017 | Slusar | G06Q 10/00 |
| 2012/0123806 A1 * | 5/2012 | Schumann, Jr. | G06Q 40/08 705/4 |
| 2012/0166229 A1 * | 6/2012 | Collins | G06Q 40/08 705/4 |

* cited by examiner

*Primary Examiner* — Richard M Camby
(74) *Attorney, Agent, or Firm* — Marshall, Gerstein & Borun LLP

(57) ABSTRACT

Systems and approaches relate to, inter alia, providing near real-time route safety and risk information. The systems and approaches may receive a request for a desired destination for vehicular travel. The systems and approaches may then access historical route data for a plurality of potential travel routes to arrive at the desired location and also access near real-time route data for the plurality of potential travel routes. The systems and approaches may further determine a risk index based on the historical route data and the near real-time route data, and present at least one travel route for the vehicle based on the calculated risk index.

20 Claims, 8 Drawing Sheets

TECHNOLOGY FOR PROVIDING REAL-TIME ROUTE SAFETY AND RISK FEEDBACK

FIELD OF THE DISCLOSURE

The present disclosure generally relates to reducing vehicle collisions and increasing vehicular safety and, more particularly, to providing near real-time feedback on route safety and associated risks.

BACKGROUND

Drivers and passengers assume a certain degree of risk of injury of property damage when travelling by vehicle. This risk may be mitigated by reducing or eliminating certain contributing factors. For example, a driver may avoid risky behavior, such as driving while intoxicated, driving while tired, or driving while texting. As another example, a driver may mitigate the risk of serious injury by driving a car with safety features such as airbags, seatbelts, and antilock brakes.

However, certain risk factors may not be mitigated. For example, the very nature of a vehicle may present certain inherent risks. A typical car may weigh thousands of pounds and may not always maneuver or stop quickly. When travelling at even a moderate speed, a collision may result in serious damage to the vehicle and serious injury to the occupants. Further, a driver or passenger of a vehicle may have no control over perhaps the greatest risk factor involved with driving: other drivers or passengers in other vehicles.

In some situations, environmental factors may contribute to the relative riskiness or safety of an area. For example, a driver approaching a one-lane bridge in a valley between two hills may not see the bridge until the vehicle has crested the hill. If the distance between the hill crest and the bridge is short, the driver may have little time to react if a second driver is approaching the bridge from the other direction. A driver may have little to no control over these environmental factors. Moreover, environmental factors contributing to the riskiness of an area may not always be readily apparent, observable, or quantifiable. For example, even if a civil engineer identifies a number of one-lane bridges as potentially dangerous, she may have no way of quantifying how risky these one-lane bridges are relative to one another. Additionally, the engineer may overlook a two-lane bridge that is seemingly safe, but which is in actuality riskier than many of the identified one-lane bridges. Because the environmental factors contributing to risk may not always be apparent, observable, or quantifiable, these environmental risk factors may go unnoticed. Thus, engineers and government officials may never identify certain high-risk areas, much less identify solutions to mitigate the risk and improve the safety of the areas for vehicle drivers and passengers.

Further, in some situations, a driver or passenger may be exposed to high risk traffic situations that occur without advance notice and in a seemingly random fashion. When relying on recommended routes from a navigation application or navigator during the course of travelling through unfamiliar locations, these high risk traffic situations may significantly increase travel times. Further these high risk traffic situations may be potentially dangerous to travel through. The routes may pass through hazardous areas, such as high risk intersections, road segments or portions of certain roads, abnormal traffic patterns, exit ramps, circular traffic flows, road construction areas, and the like, which may expose the driver or passenger to the risk of property damage, injury, time delay stemming from accidents, and the like.

SUMMARY

The present embodiments disclose systems and methods that may generally relate to reducing vehicle collisions, and particularly, inter alia, to identifying or selecting a travel route for a vehicle that avoids traversing the areas that are prone to vehicle collisions.

Hazardous areas (e.g., high risk intersections, road segments or portions of certain roads, bridges, abnormal traffic patterns, exit ramps, circular traffic flows, road construction areas, parking lots, and other transportation infrastructure) are prone to induce, or be associated with, vehicle collisions. A relative amount in which an area is hazardous can vary with time. As an example, a roadway may pose minimum driver risk during the daytime, but, based on any number of factors (e.g., poor illumination); the roadway may be associated with an increased number of vehicle collisions. Upon receiving a request for a desired destination for vehicular travel, both historical route data and near real-time route data for a number of potential travel routes is accessed.

One way to measure how hazardous an area is includes calculating a risk index for the area that is based on the historical route data and the near real-time route data. The risk index quantifies how prone the area is to vehicle collisions. When risk indices are calculated for more than one area, the risk indices may be compared to one another to enable a comparison of the relative riskiness of several areas.

Calculating the risk index may include using historical route data and near real-time route data. The historical route data can be used to calculate a number of expected collisions in an area over a time period and determine a number of observed collisions in the area over the time period. The number of expected and observed collisions may be calculated based upon (a) historical traffic data for the area, and/or (b) historical traffic data for multiple areas, such that the number of expected and observed collisions may correspond to the risk index for the area and/or risk indices for multiple areas (e.g., mean, median, or mode of the risk indices). Examples of historical traffic data include historical auto insurance claim data and/or other data, such as vehicle collision data, mobile device data, telematics data, vehicle mounted-sensor data, autonomous vehicle sensor data, smart infrastructure sensor data, and image data. The number of expected collisions may be a function of traffic volume or flow, and may be further adjusted for market penetration. The number of observed collisions may be limited to observations involving vehicles within the market corresponding to the market penetration.

Generally, the near real-time route data can be used to ascertain whether a particular route is currently experiencing an event that may impact how risky the route is. Examples of potential events that may impact route risk include accidents, increased or decreased traffic, and road engineering occurrences (e.g., construction, lane blockages, and the like) on the route. The near real-time route data is combined with the historical route data to calculate a risk index.

Specifically, the risk index is calculated based on a comparison between the number of expected collisions, the number of observed collisions, and the number of near real-time events occurring on the route.

Subsequent to calculating the risk index, the systems and methods may present a travel route for a vehicle based upon an aggregate risk index over that travel route. Upon selecting a desired travel route, the desired travel route may be presented to a device to facilitate routing of the vehicle according to the selected travel route. In these examples, the device may be one of a mobile device, an on-board computer, and a navigator associated with a vehicle, operator or passenger of a vehicle, pedestrian, bicyclist, and the like. The systems and methods may further periodically access near real-time route data for the selected desired travel route and calculate an updated risk index based on the near real-time route data for the selected route and the historical route data. Further, the systems and methods may present updated risk information for the selected desired travel route, and may further present alternative routes based on the updated calculated risk index that avoids traversing the area based upon the risk index or based upon a lower aggregate risk for a specified route, via wireless communication or data transmission over one or more radio links or wireless communication channels.

In some embodiments, the systems and methods may further include determining that the risk index for an area, or the aggregated risk index over a specified route exceeds a predetermined threshold. If the risk index for the area, or if the aggregated risk index over a specified route exceeds a predetermined threshold, the area or route may be classified as hazardous. Such a determination may be used as criteria when selecting a travel route for a vehicle that avoids the hazardous area or specified route having a risk index exceeding the predetermined threshold. If the risk index for the area does not exceed the predetermined threshold, the area may not be classified as hazardous, and the selected travel route may either traverse or not traverse the non-hazardous area.

In some embodiments, the systems and methods may further include generating a notification based upon the risk index. Such notification may be a virtual navigation map or an audible, visual, or haptic alert. For example, the virtual navigation map may visually depict the risk index. The virtual navigation map may include graphic elements depicting risk indices for one or areas. The virtual navigation map may be in the form of a heat map. The systems and methods may further transmit the generated notification to an electronic device (e.g., mobile device, an on-board computer, wearable electronics including an augmented reality appliance, and a navigator) associated with a vehicle, operator or passenger of a vehicle, pedestrian, bicyclist, and the likes to facilitate routing or re-routing that avoids traversing the area based upon the risk index, via wireless communication or data transmission over one or more radio links or wireless communication channels. The electronic devices may receive such notifications when approaching the hazardous area (e.g., an area having a risk index exceeding a predetermined threshold) for instance. The notification may indicate that potentially hazardous traffic conditions such as merging traffic, abnormal traffic flow, reduced number of lanes (e.g., 3 lanes being condensed to 2 lanes), road construction, and suboptimal road surface resulting from inclement weather conditions are on the route ahead. The systems and methods may include additional, less, or alternate functionality, including that discussed elsewhere herein.

In some embodiments, a computer system may include a processor and one or more memory devices storing non-transitory computer readable instructions that when executed cause the processor to ascertain near real-time route safety information. The instructions may cause the processor to do any one or more of the following: (i) receive a desired destination for vehicular travel; (ii) access historical route data for a plurality of potential travel routes to arrive at the desired location; (iii) access near real-time route data for the plurality of potential travel routes; (iv) calculate a risk index based on the historical route data and the near real-time route data; and (v) present at least one travel route for the vehicle based on the calculated risk index.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The above needs are at least partially met through provision of the technology for providing near real-time route safety and risk feedback systems and methods described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
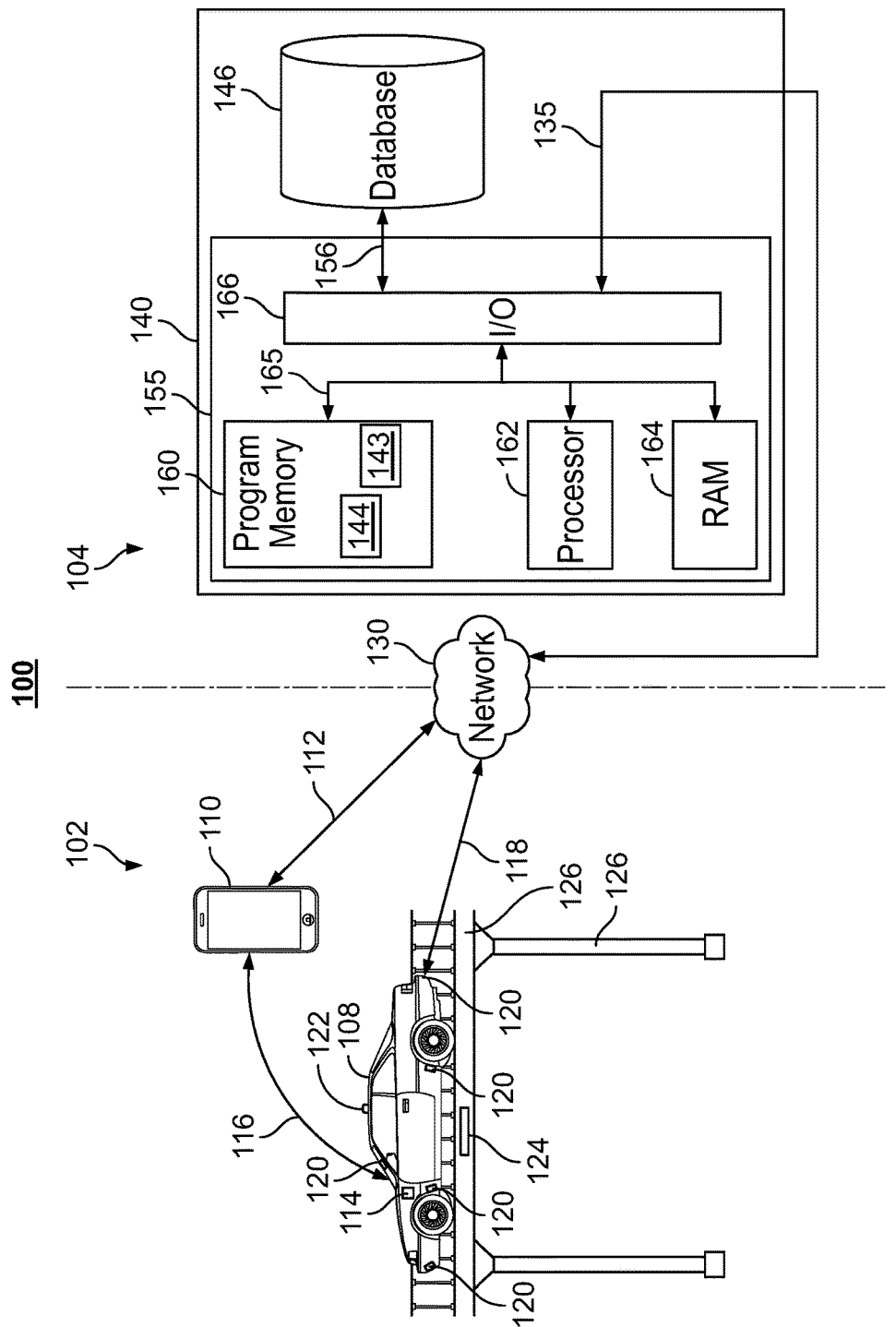
FIG. 1 illustrates a block diagram of an exemplary interconnected wireless communication system 100 on which the methods described herein may be implemented.

FIG. 1 illustrates a block diagram of an interconnected wireless communication system 100 on which the methods described herein may be implemented. The communication system 100 may generally be divided into front-end components 102 and back-end components 104, both of which may include hardware and software applications, as well as various data communications channels for communicating data between the various hardware and software components. The front-end components 102 may generate or collect near real-time and historical route and/or traffic data from mobile device-mounted sensors, vehicle-mounted sensors, smart infrastructure-mounted sensors, wearable electronics-mounted sensors, or other sensors. It is understood that by "near real-time," it is meant data that is representative of events occurring within approximately the last five minutes. Accordingly, in some examples, near real-time route data may be indicative of events occurring instantaneously or near-instantaneously within capabilities of computer processors, and in other examples, near real-time route data may be indicative of events that have occurred within approximately the last five minutes. Other examples of suitable timeframes are possible.

The near real-time and historical route data may be in the form of vehicle data, vehicle collision data, geographic location data (e.g., GPS data), telematics data, mobile device data, vehicle-mounted sensor data, auto insurance claim data, autonomous vehicle data, smart infrastructure sensor data, image data, or other data. The historical route data may provide contextual information of the vehicle 108 (e.g., a car, truck, motorcycle, bicycle), pedestrian, bicyclist, and the likes, related to traffic, vehicle damage, extent of injuries at a vehicle collision, number and identification of vehicles involved, dates and times of vehicle use, duration of vehicle use, mobile device GPS location, vehicle GPS location, speed, RPM or other tachometer readings of the vehicle, lateral and longitudinal acceleration of the vehicle, environment (e.g., construction, accidents in the area, weather, road condition), or other information relating to use of the vehicle 108. Historical route data may be collected before, during, and/or after vehicle collisions.

The near real-time route and traffic data can also provide contextual information of the vehicle 108, pedestrian, bicyclist, and the likes, related to traffic levels, accidents, road engineering occurrences (e.g., road or roadway construction, lane blockages or obstructions, and the like) on the route. As previously noted, the near real-time route data is combined with the historical route data, as will be discussed in greater detail.

Front-end components 102 may include on-board computer 114, mobile device 110 (e.g., a smart phone, a cellular phone, a tablet computer, a special purpose or general use computing device, smart watch, wearable electronics such as augmented reality appliance, vehicle navigation device, dedicated vehicle monitoring or control device, and the likes), one or more sensors 120 associated with vehicle 108, and a communication component 122. The on-board computer 114 may be a general-use on-board computer capable of performing any number of functions relating to vehicle operation or a dedicated computer for autonomous vehicle operation. Further, the on-board computer 114 may be originally installed by the manufacturer of the vehicle 108, or installed as an aftermarket modification or addition to the vehicle 108. Examples of sensors 120 include a GPS unit, a digital camera, a video camera, a LIDAR sensor, an ultrasonic sensor, an infrared sensor, an ignition sensor, an odometer, a system clock, a speedometer, a tachometer, an accelerometer, a gyroscope, a compass, a geolocation unit, radar unit, and an inductance sensor. Some of the sensors 120 (e.g., radar, LIDAR, or camera units) may actively or passively scan the vehicle environment for obstacles (e.g., other vehicles, buildings, pedestrians, etc.), roadways, lane markings, signs, or signals. Other sensors 120 (e.g., GPS, accelerometer, or tachometer units) may provide data for determining the location or movement of the vehicle 108. Other sensors 120 may be directed to the interior or passenger compartment of the vehicle 108, such as cameras, microphones, pressure sensors, thermometers, or similar sensors to monitor the vehicle operator and/or passengers within the vehicle 108. The sensors 120 may also be removably or fixedly incorporated within or connected to the on-board computer 114 or the mobile device 110 and may be disposed in various arrangements.

In some embodiments, the on-board computer 114 or mobile device 110 may each be configured to execute one or more algorithms, programs, or applications to generate, collect, or analyze various types of near real-time and historical route data from one or more sensors 120 mounted or installed within the vehicle 108. For instance, if vehicle 108 is an autonomous vehicle, the on-board computer 114 may collect data related to the autonomous features to assist the vehicle operator in operating the vehicle 108. The on-board computer 114 or mobile device 110 may further process the near real-time and historical route data to calculate a risk index for an area. In such embodiments, the on-board computer 114 or mobile device 110 may process the near real-time and historical route data to present, determine, and/or select a travel route for a vehicle based upon the risk index, and may further generate a virtual navigation map or an alert depicting the area to display on the mobile device 110 or on-board computer 114 or take other actions.

In some embodiments, the mobile device 110 may supplement the functions performed by the on-board computer 114 described herein. In other embodiments, the on-board computer 114 may perform all of the functions of the mobile device 110 described herein, in which case no mobile device 110 may be present in the system 100. Additionally, the mobile device 110 and on-board computer 114 may communicate with one another directly over link 116 or indirectly over multiple radio links.

One or more of the applications may allow a user to select destinations and routes along which the vehicle 108 will traverse. One or more of the applications may provide restrictions on vehicle use or store user preferences for vehicle use, such as in a user profile. One or more of the applications may generate and/or display a notification like a virtual navigation map or an alert depicting hazardous areas for the user to avoid traversing, and allow the user to select one or more alternative travel routes.

The on-board computer 114 or mobile device 110 may also be configured to communicate with the vehicle 108 utilizing a Bluetooth communication protocol, for instance. In some embodiments, the on-board computer 114 or mobile device 110 may communicate with vehicle 108, such as via a vehicle controller (not shown), or a vehicle telephony, entertainment, navigation, or information system (not shown) of the vehicle 108 that provides functionality other than autonomous (or semi-autonomous) vehicle control.

The communication component 122 may be utilized to transmit and receive information from external sources, including other vehicles, infrastructure, smart home controllers or sensors, or the back-end components 104. To send and receive information, the communication component 122 may include a transmitter and a receiver (or transceiver) designed to operate according to predetermined specifications, such as the dedicated short-range communication (DSRC) channel, wireless telephony, Wi-Fi, or other existing or later-developed communications protocols. The received information may supplement the data received from the sensors 120. For example, the communication component 122 may receive information that another vehicle ahead of the vehicle 108 is reducing speed, allowing for adjustments in the operation of the vehicle 108.

In some embodiments, the front-end components 102 may communicate with the back-end components 104, such as the server 140, via a network 130. As such, the back-end components 104 may receive near real-time and historical route data that was collected by the front-end components 102. The on-board computer 114 and mobile device 110 may be configured to send near real-time and historical route data to and/or receive data from network 130 using one or more suitable communication protocols, such as a Wi-Fi direct protocol, an ad-hoc cellular communication protocol, and the likes. Network 130 may be a proprietary network, a secure public internet, a virtual private network or some other type of network, such as dedicated access lines, plain ordinary telephone lines, satellite links, cellular data networks, or a combination thereof. Network 130 may be implemented as a wireless telephony network (e.g., GSM, CDMA, LTE, etc.), a Wi-Fi network (e.g., via one or more IEEE 802.11 Standards), a WiMAX network, a Bluetooth network, and the likes. The network 130 may include one or more radio frequency communication links, such as wireless communication links 112 and 118 with the mobile device 110 and on-board computer 114, respectively. Where the network 130 comprises the Internet, data communications may take place over the network 130 via an Internet communication protocol.

In further embodiments, the front-end components 102 may include an infrastructure communication device 124 for monitoring the status of one or more infrastructure components 126. Infrastructure components 126 may include roadways, bridges, traffic signals, gates, switches, crossings, parking lots or garages, toll booths, docks, hangars, or other similar physical portions of a transportation system's infrastructure. Further, the infrastructure components 126 may be temporary fixtures or components such as road construction signs or vehicles, emergency vehicles, and the likes. The infrastructure communication device 124 may include or be communicatively connected to one or more sensors (not shown) for detecting and receiving information relating to the condition of the infrastructure component 126, such as weather conditions, traffic conditions, or operating conditions of the infrastructure component 126. The infrastructure communication device 124 may further be configured to communicate the received information to vehicle 108 via the communication component 122. In some embodiments, the infrastructure communication device 124 may receive information from the vehicle 108, while, in other embodiments, the infrastructure communication device 124 may only transmit information to the vehicle 108. The infrastructure communication device 124 may be configured to monitor the vehicle 108 and/or directly or indirectly communicate information to other vehicles.

Server 140 may receive or collect near real-time and historical route data from the front-end components 102 via the network 130, store the received near real-time and historical route data in database 146 or program memory 160, process the received near real-time and historical route data (e.g., calculate the risk index based upon the near real-time and historical route data), and/or communicate information associated with the received or processed near real-time and historical route data back to the front-end components 102. Further, the server 140 may access data stored in database 146 when classifying or identifying high risk or hazardous areas, execute various functions and tasks associated with generating a virtual navigation map depicting the hazardous area or alerts of approaching hazardous areas.

The server 140 may comprise a controller 155 that is operatively connected to the database 146 via a link 156. The controller 155 may also be operatively connected to the network 130 via a link 135. The controller 155 may include a program memory 160, a processor 162, a random-access memory (RAM) 164, and an input/output (I/O) circuit 166, all of which may be interconnected via an address/data bus 165. Similarly, the memory of the controller 155 may include multiple RAMs 164 and multiple program memories 160. The RAM 164 and program memory 160 may be implemented as semiconductor memories, magnetically readable memories, or optically readable memories, for example. The program memory 160 may store various software applications, which may include a risk index mapping application 143 and a travel route determination application 144. The risk index mapping application 143 may determine and electronically map an area having a risk index onto a virtual navigation map or an alert. The travel route determination application 144 may determine and select travel routes that route a vehicle, pedestrian, or bicycle from a starting location to a destination that avoids traversing an area having a risk index. As such, both the risk index mapping application 143 and travel route determination application 144 may have access to the risk index calculated by processor 162. The various software applications may be executed by the same computer processor 162 or by different computer processors.

In some embodiments, one or more portions of the server 140 may be implemented as one or more storage devices that are physically co-located with server 140, or as one or more storage devices utilizing different storage locations as a shared database structure (e.g. cloud storage). In some embodiments, server 140 may be configured to perform any suitable portion of the processing functions remotely that have been outsourced by mobile device 110 or the on-board computer 114. For example, mobile device 110 may collect near real-time and historical route data as described herein, but may send the near real-time and historical route data to server 140 for remote processing by the server 140 instead of processing the near real-time and historical route data locally. In such embodiments, server 140 may receive and process the near real-time and historical route data to determine or select a travel route for a vehicle based upon the risk index, and may further generate and/or transmit a virtual navigation map or an alert depicting the area to the mobile device 110 or on-board computer 114 or take other actions.

Although the system 100 is shown to include one vehicle 108, one mobile device 110, one on-board computer 114, and one server 140, it should be understood that additional vehicles 108, mobile devices 110, on-board computers 114, and/or servers 140 may be utilized. For example, the system 100 may include a plurality of servers 140 and hundreds of mobile devices 110 or on-board computers 114, all of which may be interconnected via the network 130. For example, servers 140 may be dedicated for each of the various types of near real-time and historical route data described above. Furthermore, the database storage or processing performed by the one or more servers 140 may be distributed among a plurality of servers 140 in a cloud computing arrangement. This configuration may provide various advantages, such as enabling near real-time uploads and downloads of information, as well as periodic uploads and downloads of information. This may in turn support a thin-client embodiment of the mobile device 110 or on-board computer 114 discussed herein.

Figure 2:
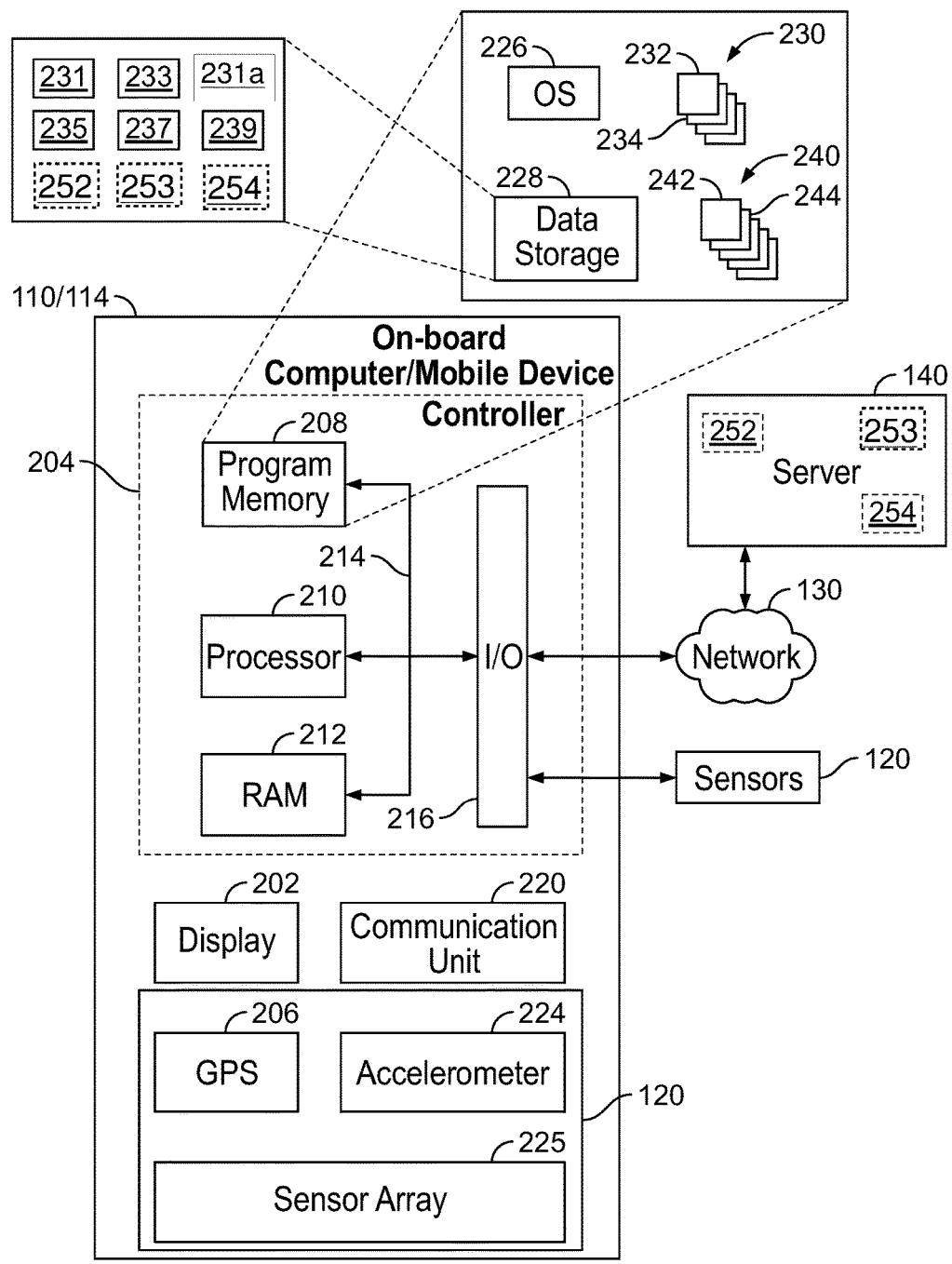
FIG. 2 illustrates a block diagram of an exemplary on-board computer or mobile device according to one embodiment.

FIG. 2 illustrates a block diagram of a system 200 including mobile device 110 or an on-board computer 114 and server 140 consistent with the system 100 of FIG. 1. The mobile device 110 or on-board computer 114 may include a display 202, a controller 204, a GPS unit 206, a communication unit 220, an accelerometer 224, a sensor array 225 (e.g., one or more cameras, accelerometers, gyroscopes, magnetometers, barometers, thermometers, proximity sensors, light sensors, Hall Effect sensors, radar units) and one or more user-input devices (not shown), such as a keyboard, mouse, microphone, or any other suitable user-input device. The communication unit 220 may provide input signals to the controller 204 via the I/O circuit 216, and may also transmit sensor data, device status information, control signals, or other output from the controller 204 to one or more external sensors within the vehicle 108 or server 140. The one or more sensors of the sensor array 225 may be positioned to determine telematics data regarding the speed, force, heading, and/or direction associated with movements of the vehicle 108. In some embodiments, the mobile device 110 or on-board computer 114 may be integrated into a single device, and in other embodiments, may be separate devices.

Similar to the controller 155 of FIG. 1, the controller 204 may include a program memory 208, one or more processors 210 (e.g., microcontrollers or microprocessors), a RAM 212, and the I/O circuit 216, all of which are interconnected via an address/data bus 214. The program memory 208 may include an operating system 226, a data storage 228, a plurality of software applications 230, and/or a plurality of software routines 240. The operating system 226, for example, may include one of a plurality of general purpose or mobile platforms, such as the Android™, iOS®, or Windows® operating systems. Alternatively, the operating system 226 may be a custom operating system designed for vehicle operation using the on-board computer 114. The data storage 228 may include data such as user profiles and preferences, application data for the plurality of applications 230, routine data for the plurality of routines 240, and other data related to road navigation and/or vehicle operation features. In some embodiments, the controller 204 may also include, or otherwise be communicatively connected to, other data storage mechanisms (not shown), such as hard disk drives, optical storage drives, or solid state storage devices located within the vehicle 108.

As discussed with reference to the controller 155, it should be appreciated that although FIG. 2 depicts only one processor 210, the controller 204 may include multiple processors 210. Processor 210 may be configured to execute any of one or more of the plurality of software applications 230 or any one or more of the plurality of software routines 240 residing in the program memory 208, in addition to other software applications. Similarly, the controller 204 may include multiple RAMs 212 and multiple program memories 208. RAM 212 and program memory 208 may be semiconductor memories, magnetically readable memories, or optically readable memories, for example.

As discussed with reference to the program memory 160 in FIG. 1, data storage 228 may store various software applications 230 implemented as machine-readable instructions, which may include a risk index mapping application 232 and a travel route determination application 234. The risk index mapping application 232 may determine and electronically map an area having a particular risk index onto a virtual navigation map or an alert. The travel route determination application 234 may determine and select travel routes that route a vehicle, pedestrian, or bicycle from a starting location to a destination that avoids traversing an area having a risk index. In some examples, the travel route determination application 234 may require a user input to determine and select a desired travel route. The various software applications may be executed by the same computer processor 210 or by different computer processors. The various software applications 230 may call various software routines 240, such as risk index mapping routine 242 and/or a travel route determination 244 to execute the various software applications 230.

Figure 3:
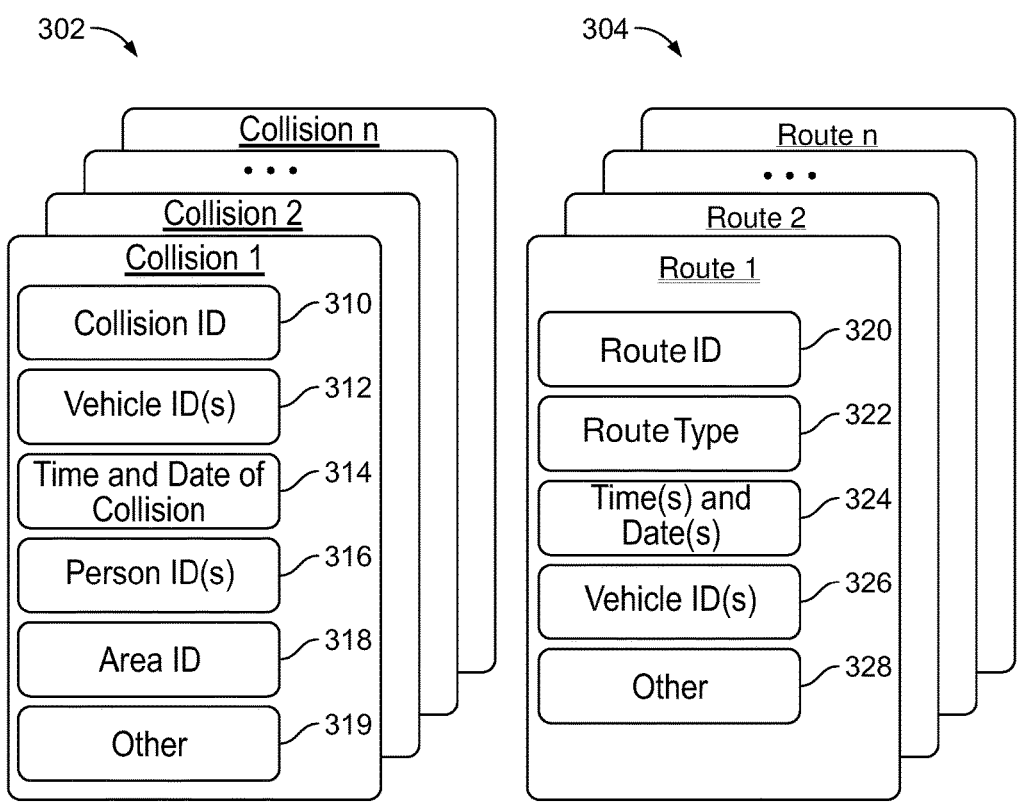
FIG. 3 illustrates exemplary historical traffic data according to one embodiment.
Figure 4:
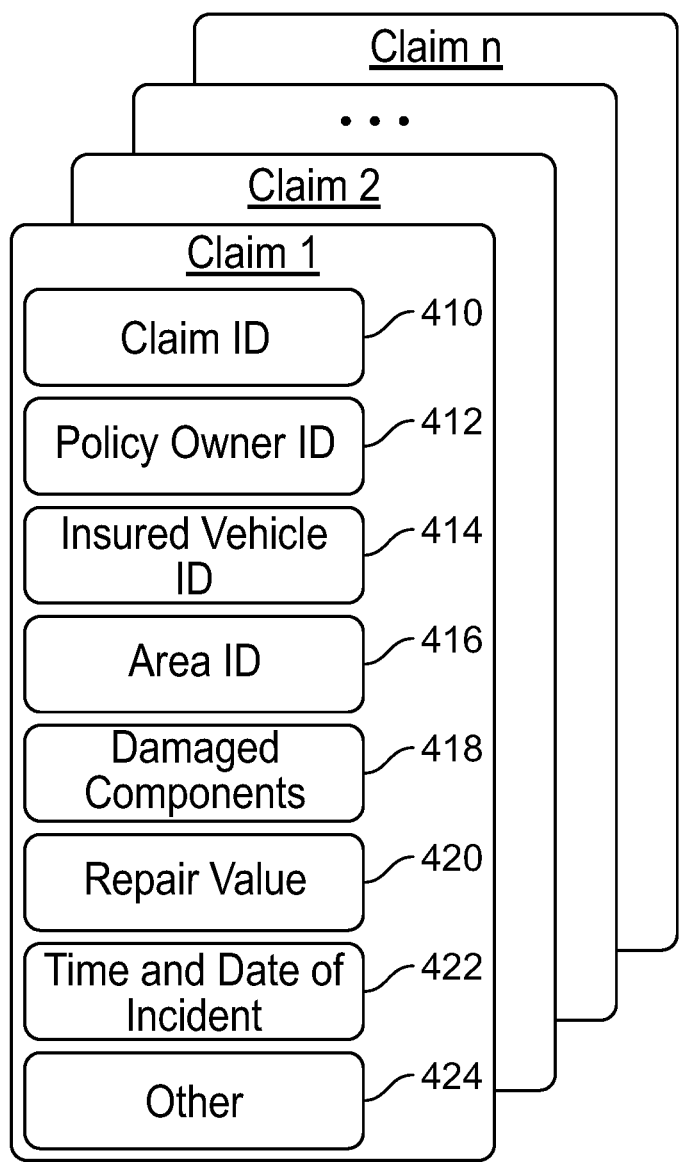
FIG. 4 illustrates exemplary claims data according to one embodiment.
Figure 6:
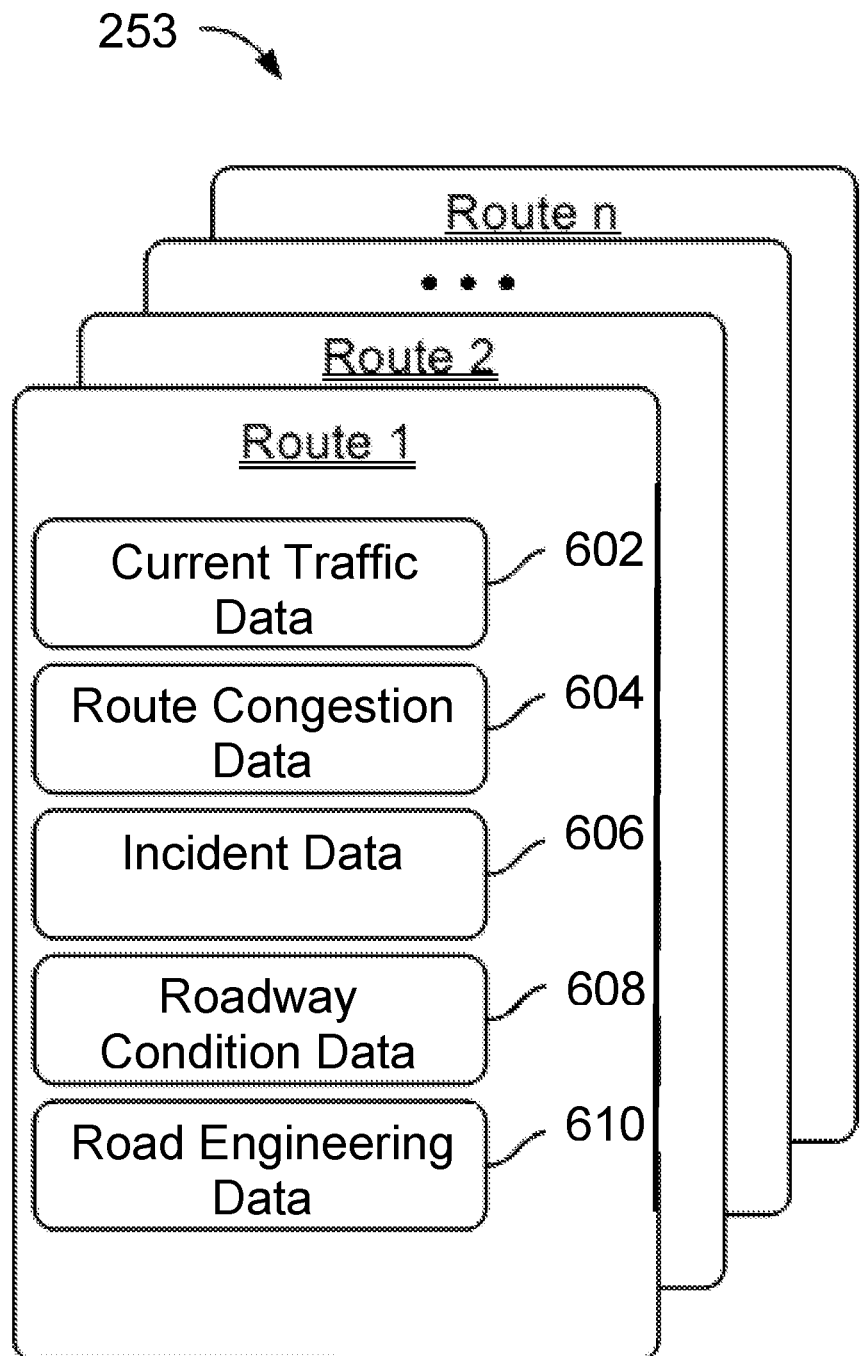
FIG. 6 illustrates exemplary near real-time traffic data according to one embodiment.

In addition to applications and routines, the data storage 228 may store various data, such as expected collisions data 231, observed collisions data 233, risk index data 235, travel route data 237, and/or notification data 239. In one embodiment, the data storage 228 may include one or more of near real-time and historical route data 252 and/or claims data 254. In other embodiments, near real-time and historical route data 252 and/or claims data 254 may be stored in database 146 managed by server 140. Exemplary historical data 252 is shown in FIG. 3, and exemplary near real-time route data 253 is shown in FIG. 6. Exemplary claims data 254 is shown in FIG. 4.

Expected collisions data 231 represents an expected number of collisions. The expected collisions data 231 may include data representing a number of collisions that may be expected for any one or more of the following: a particular area of traffic (e.g., an intersection, street, portion of a street, parking lot, and the likes), a particular time, such as the time of year (e.g., a particular date, month, and/or season), a day of the week (e.g., Sunday-Saturday), a time of day (e.g., a particular time or a general time, such as "evening" or "morning"), a volume of traffic (e.g., a number of cars per hour), and the likes. In some embodiments, the processor 210 generates or collects some or all of the expected collisions data 231 based upon the historical traffic data 252, the near real-time route data 253, and/or the claims data 254 that are gathered from various sources, such as vehicle 108, sensors 120, and server 140.

For example, claims data 254 may be associated with actual insurance claims arising from real world vehicle collisions, such as data scrubbed of personal information, or otherwise de-identified auto insurance claim data. Claims data 254 generally represents insurance claims filed by insurance policy owners. The claims data 254 may identify a particular collision, policy owners, involved vehicles, a location where the collision occurred, property involved, repair and/or replacement costs and/or estimates, a time and date of the collision, and/or various other information. In one embodiment, actual claim images (such as mobile device images of damaged vehicles, or images acquired via vehicle-mounted cameras and/or sensors) may be analyzed to associate an amount of physical damage shown in one or more images of vehicles involved in a vehicle collision with a repair or replacement cost of the vehicles. The actual claim images may be used to estimate repair or replacement cost for vehicles involved in past, recent, or current vehicle collisions. The processor 210 may then analyze the historical traffic data 252, the near real-time route data 253, and/or the claims data 254 to calculate a risk index for a particular area of traffic or route.

The system 200 may acquire historical traffic data 252, near real-time route data 253, and/or the claims data 254 for a number of comparable areas near a potential hazardous area of interest. For each comparable area, the acquired historical traffic data 252 may include a number of collisions for a particular time period and/or a traffic volume. The processor 210 may calculate a "per vehicle" collision rate for each comparable area, and may rely on an average of these "per vehicle" collision rates to estimate the expected number of collisions for the potential hazardous area of interest (e.g., based upon the expected traffic volume of the area of interest). Accordingly, the processor 210 may calculate expected collisions for a particular area (shown in more detail in FIG. 5) and store the calculated expected collisions to the data storage 228 as expected collision data 231.

The processor 210 may then receive data identifying observed collisions from server 140 for the same area in which expected collisions were calculated. For example, in some embodiments, the processor 210 may transmit a query to server 140 managing the claims database 254 in order to receive data identifying observed collisions from server 140. The processor 210 or server 140 may identify from the claims data 254 collisions that occurred within the area of interest and within the particular time period. The number of identified collisions resulting from the query may be saved to the data storage 228 as observed collision data 233. Observed collisions data 233 may identify a total number of collisions that actually occurred at a certain area. Observed collisions data 233 data may be indicative of collisions involving policy holders associated with a particular insurance company, or may also be indicative of collisions involving policy holders and/or vehicles associated with multiple companies.

For each comparable area, the acquired near real-time route data 253 may include a number of near real-time incidents or events that may impact how risky the route is. Examples of potential events that may impact route risk include accidents, increased or decreased traffic, and road engineering occurrences (e.g., construction, lane blockages, and the like) on the route. The near real-time route data 253 only pertains to events which are presently impacting a route, or have impacted the route within the past ten minutes from when the system 200 acquired the near real-time data 253. The near real-time route data 253 may be indicative of the occurrence of the event, or alternatively or additionally, the near real-time route data 253 may include quantitative data regarding the occurrence or event such as an anticipated delay time. Accordingly, the processor 210 may receive and use the near real-time route data 253 from server 140 to calculate an expected delay for a particular area (shown in more detail in FIG. 6) and store the calculated expected delay to the data storage 228 as expected delay data 231a. For example, in some embodiments, the processor 210 may periodically transmit a query to server 140 in order to receive the near real-time route data 253 within the area of interest and within the particular time period.

The processor 210 may next compare the expected collisions, the observed collisions, and the number of present occurrences or events to calculate the risk index to evaluate the riskiness of an area or areas. For example, in some embodiments, the processor 210 may divide the number of observed collisions by the number of expected collisions and multiply the number of present occurrences to the resulting quotient. The processor 210 may store the resulting value to the data storage 228 as risk index data 235 for the particular area. In such embodiments, a risk index value equal to one may suggest that an area is about as dangerous as expected; a risk index value greater than one may suggest that the area is more risky than expected; and a risk index value less than one may suggest that the area is less risky than expected. Accordingly, the risk index data 235 represents one or more risk indices calculated by the processor 210 after comparing the expected collisions to the observed collisions and current events to calculate the risk index.

For example, in one scenario, the expected collisions data 231 may indicate that 100 collisions were expected for the month of January 2014 at the intersection of Main Street and Broadway. The observed collisions data 233 may indicate that 110 collisions were observed during the month of January 2014 at the intersection of Main Street and Broad. The expected delay data 231a may indicate that two events are presently occurring on the route. Thus, the processor 210 may calculate the risk index to be 110/100*2, or 2.1. A risk index of 2.1 may suggest that the intersection of Main Street and Broadway is either riskier or has longer travel times than expected.

Furthermore, in yet another example, the expected collisions data 231 may indicate that 20 collisions were expected in the month of February at the intersection of Main Street and Broadway in the presence of snow and ice on the road. Further, the observed collisions data 233 may indicate that 40 collisions have so far been reported during the month of February when snow and ice have also been reported. The expected delay data 231a may indicate that four accidents, spinouts, or other events are presently occurring on the route. Thus, the processor 210 may calculate the risk index to be 40/20*4, or 8.0 at the present time. A risk index of 2.0 may suggest that the intersection of Main Street and Broadway is riskier when snow and ice is present, which is confirmed by the number of present incidents on the route.

In some embodiments, the risk index may be calculated differently. For example, in some embodiments, the processor 210 may subtract the observed collisions from the expected collisions and may store the result as risk index data 235. In such embodiments, a value of 0 may suggest that an area is about as risky as expected; a positive value may suggest that an area is less risky than expected, and a negative value may suggest that the area is riskier than expected. The present occurrence data may be appended to the calculated difference to impact the calculation.

In some examples, the risk index may be separately calculated and presented from the present occurrence data. For example, the risk index may be calculated solely based on the observed collisions and the expected collisions, and this risk index may be presented to a user to illustrate how risky the route is. The present occurrence data may be provided as a separate value so the user may determine whether the route presently is too risky for traversal. Other examples are possible.

In some embodiments, the processor 210 may execute a travel route determination application 234 to determine, present, and/or select travel routes that route a vehicle, pedestrian, or bicycle from a starting location to a destination that avoids traversing an area having a risk index. The processor 210 may store the selected travel routes to the data storage 228 as travel route data 237.

In some embodiments, the processor 210 may execute a risk index mapping routine 242 to generate, for example, a virtual navigation map or alert to depict one or more risk indices for areas within a depicted region, by performing one or more of the following operations: (i) identifying a region; (ii) identifying one or more risk indices associated with areas within the region; and/or (iii) generating a virtual navigation map or alert that may include or is overlaid with elements (e.g., graphic, audible, haptic) depicting the identified risk indices along with the areas.

First, the processor 210 may identify a region. This may be responsive to user input received via one or more input devices coupled to the I/O 216. For example, a user may specify a particular zip code, city or particular address. In some embodiments, the user may specify a particular area (e.g., a landmark, intersection, building, parking lot, address, and the likes) and a radius.

Second, the processor 210 may identify one or more risk indices associated with areas within the region. For example, if the user specified an address, the processor 210 may identify risk indices associated with potential routes a user may take to arrive at the entered address.

Third, the processor 210 may generate a virtual navigation map or alert that may include or that is overlaid with elements corresponding to the identified risk indices. Each element may indicate a risk index associated with a route. For example, certain colors, shapes, or sizes of graphic elements may indicate risky or hazardous routes. A route with a high risk index may be encompassed by a large, red circle, for example, or may be partially or completely colored red, while a route with a low risk index may be encompassed by a smaller, blue circle, or may be partially or completely colored blue. Various other shapes, symbols, and/or colors may be utilized to indicate risk indices (e.g., triangles, hexagons, exclamation points, and the likes). In some embodiments, graphic elements may be names that are, e.g., colored or sized to correlate to the risk index. For example, the graphic elements may be street names (e.g., "Broadway") or intersection names (e.g., "Broadway and Main").

In some embodiments, a graphic element may be a depiction of an area along the route, colored or sized to correlate to the risk index. For example, if the intersection of Broadway and Main has a high risk index, the graphic element may be a depiction of Broadway and Main (e.g., graphics of the intersecting streets), colored red and/or enlarged, for example. If the intersection of Broadway and Main has a low risk index, the graphic element may be a depiction of Broadway and Main, colored blue and shrunk relative to a normal size, for example.

Figure 8:
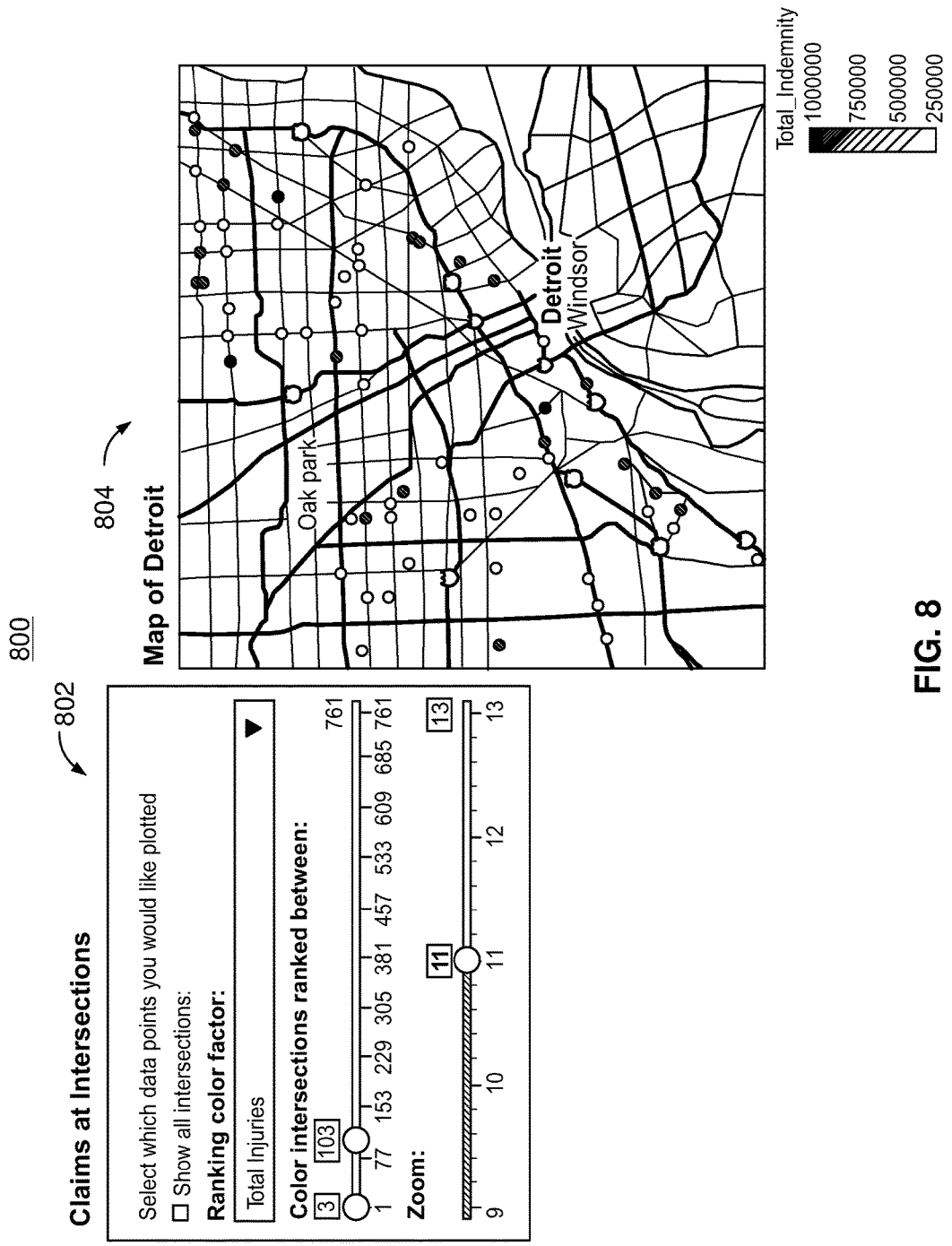
FIG. 8 illustrates an exemplary user interface according to one embodiment.

The processor 210 may store the virtual navigation map to the data storage 228 as notification data 239. In some embodiments, the processor 210 may display the virtual navigation map via the display 202. The virtual navigation map may be depicted as a heat map, using various colors, for example, to indicate different levels of risk. An example virtual navigation map is shown in FIG. 8.

A user may rely on the displayed virtual navigation map to evaluate the risk of various routes. For example, a driver or potential driver may rely on the virtual navigation map to choose less risky travel routes. In some instances, a civil engineer may rely on the virtual navigation map to identify areas that potentially need infrastructure improvement. For example, a high-risk area may need additional stop lights or street lights to reduce the number and/or severity of collisions at the area.

In another example operation, server 140 may (i) collect historical traffic data 252, near real-time route data 253, and/or auto claim data 254 via wireless communication or data transmission over one or more radio links or wireless communication channels; (ii) determine hazardous routes from the historical traffic data 252, near real-time route data 253, and/or auto claim data 254; and (iii) generate a notification, such as a virtual navigation map, of the hazardous routes. Subsequently, server 140 may transmit the hazardous route information and alternative travel route recommendations to vehicle 108, mobile device 110, or wearable electronics of a user via wireless communication or data transmission over one or more radio links or wireless communication channels.

FIG. 3 further illustrates example historical traffic data 252 that was described in FIG. 2, according to one embodiment. The historical traffic data 252 may include collision data 302 and/or route data 304, and may include historical or current auto insurance claim data.

The collision data 302 may include records for multiple collisions. For each collision, the collision data 302 may include a record of relevant information. Each collision record may include or reference one or more of: a collision identifier (ID) 310 unique to the collision; vehicle ID(s) 312 identifying the vehicle(s) involved in the collision; time and date data 312 identifying when the collision occurred; person ID(s) 316 identifying people involved in the collision (e.g., policy holders); an area ID 318 identifying an area of the collision; and/or other data 319. The system 200 may utilize the collision data 302, e.g., to identify a number of collisions for a particular area within a particular time period.

The route data 304 may include records for multiple routes. For each route, the route data 304 may include a record of relevant information. Each route record may include or reference one or more of: a route ID 320 unique to the route; a route type 322 identifying a route type (e.g., bridge, street, intersection, highway, and the likes); times and/or dates 324 of observed traffic on the route; vehicle ID(s) 326 identifying vehicles observed on the route; and/or other data 328. The system 200 may utilize the route data 304 to, e.g., calculate a traffic volume for a given route for a time period (e.g., over a week, month, year, and the likes).

FIG. 4 further illustrates example claims data 254 according to one embodiment. The claims data 254 may include records for multiple insurance claims filed by policy holders. For each claim, the claims data 254 may include a record of relevant information. Each claim record may include or reference one or more of: a claim ID 410 unique to the claim; a policy owner ID 412 unique to the policy holder who filed the claim; a vehicle ID 414 unique to the vehicle owned by the policy holder; an area ID 416 unique to the area where the incident or collision occurred; damaged components data 418 identifying the property damage resulting from the incident or property; a repair or replacement value 420 describing the costs associated with repairing or replacing the damaged components; time and date information 422 unique to the time when the incident or collision occurred; and/or other information 424, such as data indicating a number and extent of personal injuries resulting from a vehicle collision and/or data indicating an extent of liability damages resulting from a vehicle collision. The system 200 may analyze the claims data 254 to identify a number of collisions involving policy holders for a particular area within a particular time period. The system 200 may compare this number of collisions to a market-adjusted expected collisions number, enabling a calculation of a risk index particular to a particular market (e.g., to identify a risk index for a route specific to customers of a particular insurance company, or to identify a risk index for an area specific to vehicles of a particular make and/or model).

Figure 5:
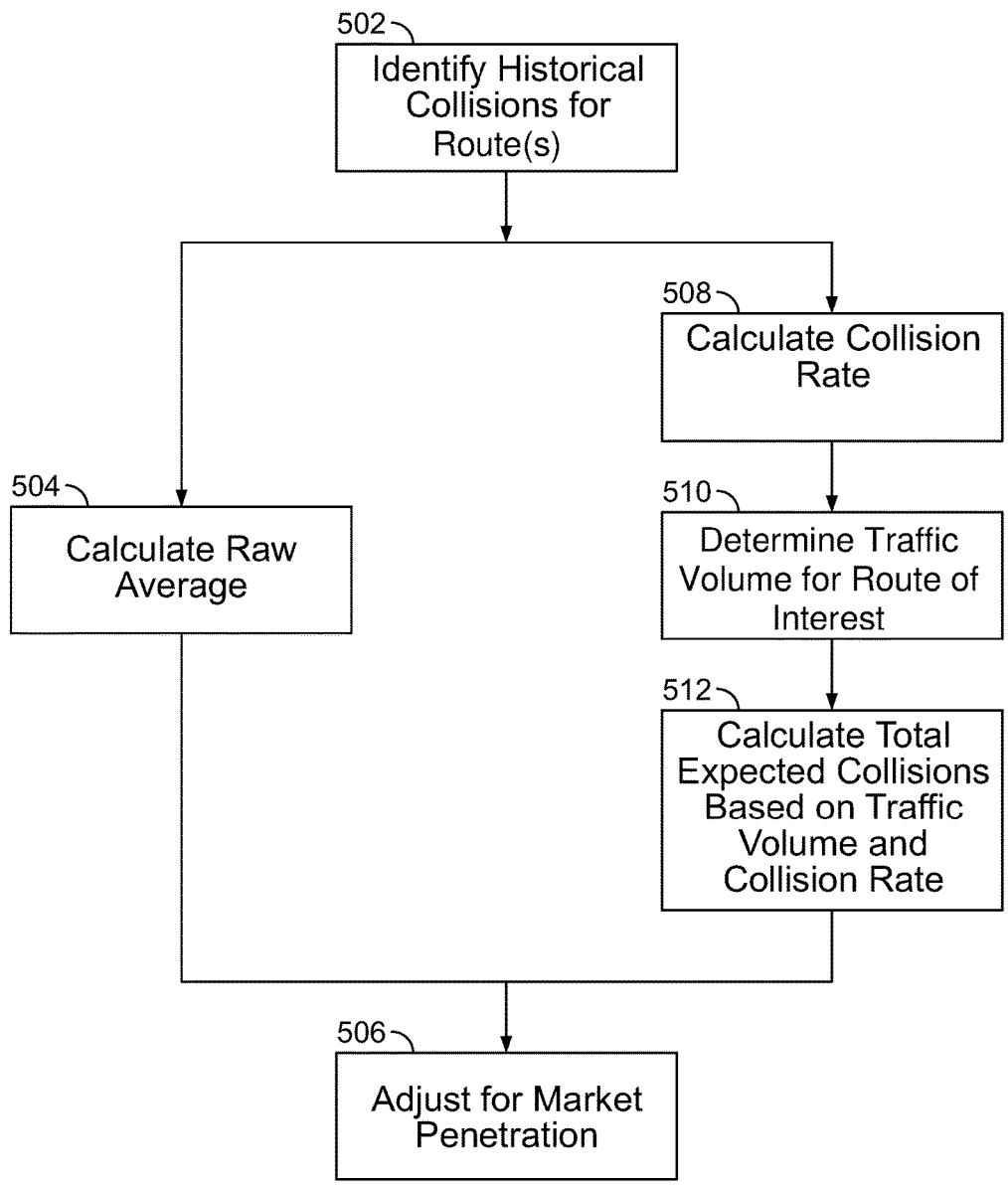
FIG. 5 illustrates an exemplary flowchart for calculating expected collisions according to one embodiment.

FIG. 5 illustrates a computer-implemented method 500 for calculating expected collisions according to one embodiment. The method 500 may be implemented, in whole or in part, by the computer system 200 shown in FIG. 2. The method 500 may be stored to memory as one or more instructions or routines.

The method 500 may begin when historical collisions are identified for a particular route or routes (block 502). In one embodiment, historical collisions are identified for the route of interest. For example, historical traffic data 252 may identify all historical collisions that have occurred at the route of interest. In one embodiment, the system 200 may identify historical collisions that occurred in recent history (e.g., in the last month, the last few months, the last year, the last few years, and the likes). The system 200 may then identify an average number of collisions for a time period corresponding to a time period of interest (e.g., a week, month, and the likes). As an example, the system 200 may rely on the last five years of data to calculate the average number of collisions per month for the route of interest.

In one embodiment, historical collisions at areas near the route of interest may be identified. For example, a first and second area near the route of interest may be identified and used to calculate the expected collisions. Data for the first and second area of interest may be used in addition to, or in place of, data for the route of interest, depending on the embodiment. There may not be any data for some routes of interest, and thus data from multiple areas near the route of interest may be used instead. By utilizing data from multiple areas within a region, the system 200 may obtain an expected collisions value that represents a regional average. Thus, when observed collisions are eventually compared to the expected collisions to obtain a risk index, the system 200 may determine which routes are more or less risky than might be expected for the region.

In one embodiment, a raw average number of expected collisions may be calculated based upon the identified historical collisions (block 504). For example, the first area near the route of interest may have 10 collisions per month over the last five years, the second area near the route of interest may have 20 collisions per month over the last five years, and the actual route of interest may have six collisions per month over the last five years. The raw average number of expected collisions for the region including the first area, the second area, and the route of interest would be 12 collisions per month. This raw average may be used as the expected total collisions value for the total area encompassing the route of interest and the first and second areas. In other embodiments, the raw average number of expected collisions may be tailored to other subsets of the total area, such as the first and second areas only.

In one embodiment, after historical collisions are identified for the route(s) (block 502), traffic volume is identified for each of the routes in order to calculate a collision rate for each route (block 508). For example, if the first area has an average traffic volume of 100 vehicles per month, the collision rate for the first area would be 10 collisions per 100 vehicles. If the second area has an average traffic volume of 500 vehicles per month, the collision rate for the second area would be 20 collisions per 500 vehicles, or equivalently, four collisions per 100 vehicles. Thus, despite having more collisions per month, the second area would have a lower collision rate for a given traffic volume. As another example, if the route of interest has an average traffic volume of 200 vehicles per month, the collision rate for the route of interest would be six collisions per 200 vehicles, or equivalently, three collisions per 100 vehicles.

An average collision rate may be calculated for the region encompassing each of the areas described above. For example, the average collision rate for the first area, second area, and route of interest would be 5.6 collisions per 100 vehicles ((10+4+3)/3=5.6).

A traffic volume may be determined for the route of interest (block 510). The traffic volume may be determined by analyzing the historical traffic data 252. For example, the route of interest may have a traffic volume of 200 vehicles per month.

The total expected collisions for the route of interest may be calculated based upon the determined traffic volume and the collision rate (block 512). For example, if the route of interest has a traffic volume of 200 vehicles per month and the calculated collision rate is 5.6 collisions per 100 vehicles, the total expected collisions for the route of interest during a given month would be 11.2 collisions. Similarly, if the first area has a traffic volume of 100 vehicles per month and the calculated collision rate is 5.6 collisions per 100 vehicles, the total expected collisions for the first area during a given month would be 5.6 collisions. Although the average collision rate of 5.6 collisions per 100 vehicles was used, the collision rate for a particular route may be used in other embodiments. For example, the total expected collisions for the first area during a given month may be calculated by using the collision rate for the first area (i.e., 10 collisions per 100 vehicles as calculated above) rather than the average collision rate of 5.6 collisions per 100 vehicles.

In some embodiments, the system 200 may adjust the total expected collisions for market penetration (block 506). For example, an insurance company may be interested in calculating the expected collisions for the area involving vehicles owned by policy holders. In some embodiments, the system 200 may make this calculation using a market penetration value, which represents a percentage of the total market. For example, an insurance company with 30% market penetration insures an estimated 30% of the cars on the road for a route of interest. In some embodiments, the system 200 may calculate the market penetration by analyzing the claims data 254 to determine how many policy holder vehicles exist in a given area and by analyzing the historical traffic data 252 to determine a total number of vehicles active along the route. The system 200 may then multiply the resulting market penetration value by the total expected collisions for the route to obtain a market adjusted expected collisions value. For example, given 30% market penetration and a total expected collisions value of 11.2, the market adjusted expected collisions value would be 3.36.

FIG. 6 illustrates exemplary near real-time route data 253 for any number of routes according to one embodiment. The near real-time route data 253 is a collection of data from various sources having up-to-date information of events on desired routes. The near real-time route data 253 may include current traffic data 602 for a particular route, route congestion data 604 for the particular route, incident data 606, roadway conditions 608, road engineering data 610, and the likes. It is understood that any number of additional data sources may be used to provide updates to the near real-time route data 253.

The current traffic data 602 may include an approximation of the number of vehicles currently traveling along a particular route, and may be obtained by the on-board computer 114. The current traffic data 602 may be sourced from a tracking database provided by agencies such as the Department of Transportation that monitors the number of vehicles currently passing checkpoints along a route. In other embodiments, other vehicles may also have on-board computers 114 and/or mobile devices 110 which communicate their location to back-end components such as the server 140. This location information can be totaled to provide a numerical quantity of current traffic data 602.

In some examples, the current traffic data 602 may be used in conjunction with an expected traffic volume to generate the route congestion data 604. The expected traffic volume may change based on the time of day, month, year, and if there are current events occurring nearby which may generate large amounts of traffic. For example, if the current traffic data 602 indicates that there are 100 drivers on a particular length of roadway, but the particular length of roadway has an expected vehicle quantity of 50, the length of roadway may have two times as many drivers as expected, and thus may be considered congested. It is understood that any number of approaches may be used to determine the level of congestion of the particular roadway.

The incident data 606 may include near real-time information describing current incidents (e.g., accidents, slowdowns, and the likes) along the desired route. The incident data 606 may be obtained from any of the sources previously described such as self-reporting from other vehicles, emergency services data, and the likes. Similarly, the roadway conditions data 608 may also include near real-time information describing current roadway conditions (e.g., black ice present, flooding of lengths of road, windy overpasses, and the like) along the route, which may be obtained from any number of sources.

The road engineering data 610 may include information regarding locations experiencing construction or similar conditions. For example, a utility repair vehicle may be presently blocking a lane of the roadway, or a construction vehicle may be repairing potholes along the roadway. The road engineering data 610 may also be obtained from any of the sources previously described such as self-reporting from other vehicles, emergency services data, and the likes.

Figure 7:
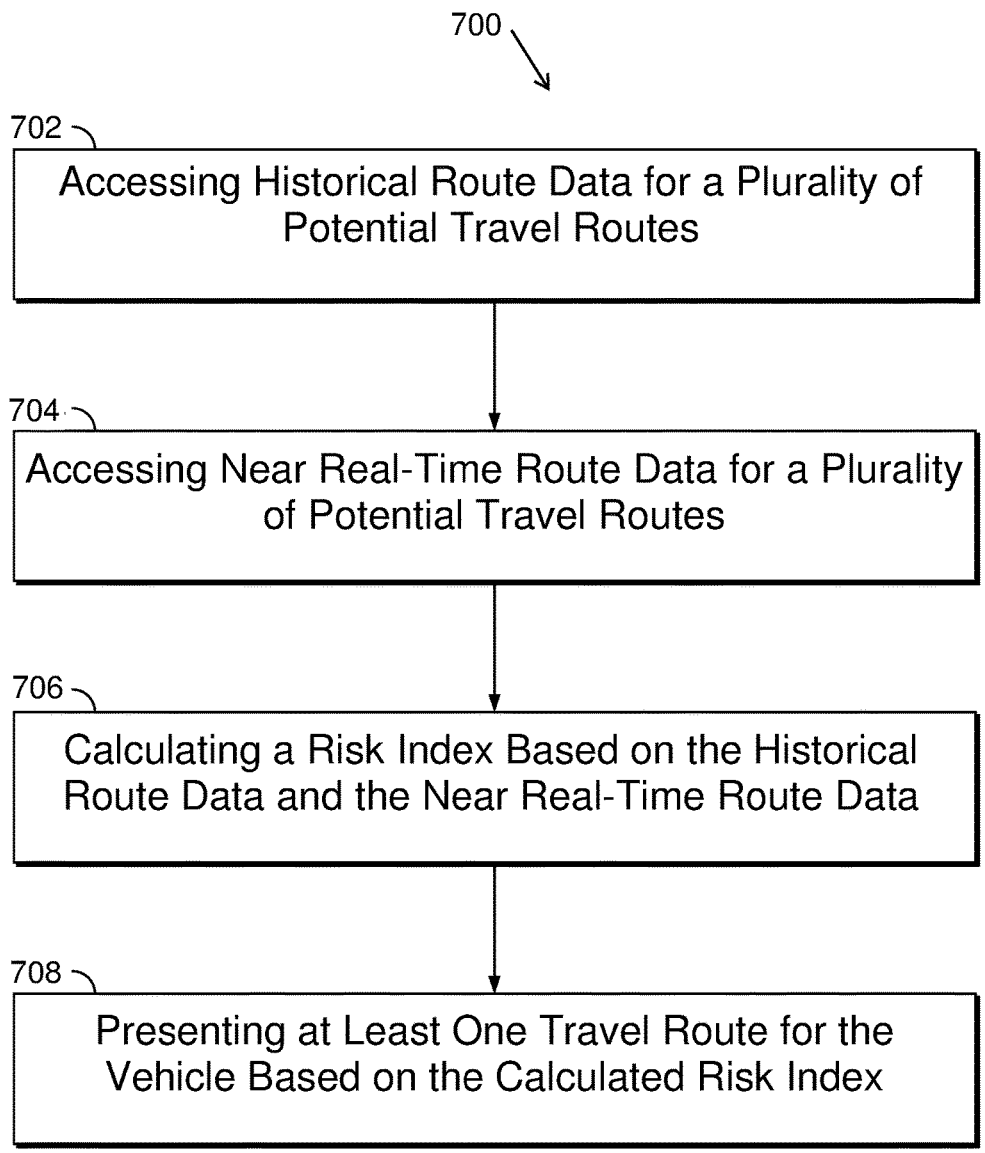
FIG. 7 illustrates a flowchart for near real-time risk-based route selection according to one embodiment.

FIG. 7 illustrates a computer-implemented method 700 for risk-based route selection according to one embodiment. The method 700 may be implemented, in whole or in part, by the systems 100 or 200 shown in FIGS. 1 and 2, implemented via one or more processors (e.g., processor 210 or processor 162), transceivers, and/or sensors 120, and/or via computer-executable instructions stored on non-transitory computer-readable medium or media. Accordingly, in some embodiments, server 140 having access to historical traffic data 252, near real-time route data 253, and/or claims data 254 may carry out the method 700. In other embodiments, on-board computer 114 or mobile device 110 having memory that stores historical traffic data 252, near real-time route data 253, and/or claims data 254 may carry out the method 700. In other embodiments, on-board computer 114 or mobile device 110 may retrieve historical traffic data 252, near real-time route data 253, and/or claims data 254 from server 140 and subsequently carry out the method 700. The method 700 may be stored in memory (e.g., program memory 208) or a database (e.g., database 146) as one or more instructions or routines.

The method 700 may begin by, in response to a request for a desired destination for vehicular travel, accessing historical route data for a number of potential travel routes to arrive at the desired location (block 702). The historical route data 252 may include data regarding the number of expected collisions, and may be analyzed to calculate an average number of collisions used for the expected collisions. For example, historically, a particular route may average 10 collisions per month. Thus, the number of expected collisions for the particular route may be 10 collisions per month. In some embodiments, historical traffic data for multiple routes may be analyzed, and the average number of collisions may be calculated for all of the routes. Although an average number of collisions are used for the expected collisions, other statistical measures are envisioned, such as determining the mode or median for the historical traffic data to calculate the expected collisions.

In some embodiments, the number of expected collisions may be a function of traffic volume. For example, a collision rate may be represented by the number of collisions per 100 vehicles of traffic based upon historical traffic data for a desired route (e.g., 5.5 collisions per 100 vehicles of traffic). Accordingly, when a traffic volume for the route independent of any collisions is observed (e.g., 200 vehicles per month), then the number of expected collisions for the route may be calculated (e.g., the area of interest may expect 11 collisions per month per 200 vehicles of traffic).

In one embodiment, the number of expected collisions may be adjusted for market penetration. Using the expected 11 collisions per month per 200 vehicles of traffic as an example, if an insurance company has 25% market penetration, the insurance company may calculate an expected collisions value of 2.75 (i.e., 25% of 11) collisions per month per 200 vehicles of traffic, representing the expected number of collisions that involve vehicles insured by the insurance company. As another example, a vehicle manufacturer may adjust for market penetration to identify an expected number of collisions that involve vehicles of a particular make and/or model.

The historical route data 252 may further be accessed to determine a number of observed collisions on the same route for which expected collisions were calculated, over the same time period. Claims data 254, for instance, may be utilized to identify the number of actual collisions observed along the route. For example, an analysis of claims data 254 may reveal that insurance claims have been filed on 15 collisions that have occurred along the route of interest described above over the course of a month. When compared to the expected collision value of 11 calculated in the example above, the route of interest experienced more collisions (i.e., 4 more collisions) than expected.

Method 700 may then access near real-time route data 253 for a number of different travel routes (block 704). The near real-time route data 253 may provide a precise, up-to-date illustration of events and/or occurrences which may make a route more or less risky, and/or which may increase the overall time required to traverse the potential desired route.

Method 700 may then calculate a risk index for the area based upon the historical route data 252 and the near real-time route data 253 (block 706). For example, the number of observed collisions may be divided by the number of expected collisions, and the number of events or occurrences along the route may be appended to this number. A risk index value greater than a specified number (e.g., three) may indicate that the route is riskier than expected, and a risk index value less than this number may indicate that the route is less risky than expected. Using the numbers from the example above, if a route has two ongoing occurrences, the route of interest may be determined to have a risk index value of 3.36 (i.e., the result of 15/11+2).

Method 700 may then present a travel route to be selected for a vehicle based upon the calculated risk index (block 708). For example, the travel route may avoid the route having the highest risk index value.

In some examples, a user may select a desired route after being presented with any number of potential routes having varying risk levels. The user may then begin traversing the route in their vehicle 108. During travel, the system 100 may periodically access the server 140 to obtain the near real-time route data 253 via the on-board computer 114 and/or mobile device 110. This near real-time route data 253 is periodically updated, for example, at intervals of between every five seconds and every ten minutes. In other examples, the near real-time route data 253 may be updated as events occur, meaning the new data is pushed to the server 140 as events occur. In some examples, the new data is provided as the notification data 239. The system 100 may cause the display 202 to indicate the presence of a new event, and may include an indication of increased risk and/or travel time depending on the type and/or severity of the event. The system may then calculate an updated risk index for the present route using the most up-to-date near real-time route data 253, and may calculate updated risk indices for alternate routes using any updated near real-time route data 253 for those particular routes. The system 100 may also calculate estimated total travel times for the present route and the alternative routes, thereby allowing the user to select a new route based on estimated duration and/or associated risk.

FIG. 8 illustrates a user interface 800 according to one embodiment. The user interface 800 may be generated based, in part, on the risk index data 235, travel route data 237, and/or notification data 239 shown in FIG. 2. The user interface 800 may be displayed via the display 206 shown in FIG. 2. In some embodiments, the user interface 800 may be displayed via other displays. For example, the system 200 may transmit the risk index data 235, travel route data 237, and/or notification data 239 to a vehicle computer where the user interface 800 may be rendered. In one embodiment, the user interface 800 may be rendered on a webpage, and may be accessible by a computer having Internet access, such as a vehicle controller, vehicle navigation unit, and/or mobile device 110.

The user interface 800 may include an input interface 802. A user may utilize the input interface 802 to enter a desired location and/or to select selection criteria for displaying risk indices in order to generate a virtual navigation map. In the example shown, the input interface 802 is displaying risk indices for routes (intersections in this case) ranked between 3 and 100. Thus, the graphic elements overlaying the virtual navigation map correspond to portions of routes having a risk index falling between the third highest risk index (e.g., indicating the third riskiest area) and the 100$^{th}$ highest risk index (e.g., indicating the 100$^{th}$ riskiest area).

The input interface 802 may also allow a user to adjust or set their risk tolerance prior to determining a desired route to traverse. Further, this preference may be used to determine when to notify the driver of real-time incidents that may impact the risk index and route safety. For example, more risk averse drivers may set a preference to generate routes that have a lower, more moderate risk factor. This preference may also result in an increased likelihood of providing updated routes based on the occurrence of real-time events. Conversely, a more risk tolerant driver may choose to be presented with routes having any range of risk factors, and further may wish to never reroute their previously-selected route based on safety. In some examples, these preferences may be transmitted to the server 104 for storage and desired driver analysis.

Machine learning techniques have been developed that allow parametric or nonparametric statistical analysis of large quantities of data. Such machine learning techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. In some embodiments, the methods and systems described herein may use machine learning techniques to identify and estimate the effects of observed or latent variables such as vehicle location, time of day, type of vehicle collision, type of vehicle damage or personal injury, vehicle collision location, amount of vehicle damage or medical expenses associated with a vehicle collision, or other such variables that influence the risks associated with vehicle collisions or vehicle travel.

Some embodiments described herein may include automated machine learning to determine hazardous areas, determine risk levels of the hazardous areas, identify relevant risk factors of the hazardous areas, optimize vehicle, bicycle, or pedestrian routes to avoid hazardous areas, generate or update electronic or virtual navigation maps, generate alerts to vehicles, drivers, bikers, or pedestrians, and/or perform other functionality as described elsewhere herein.

Although the methods described elsewhere herein may not directly mention machine learning techniques, such methods may be read to include such machine learning for any determination or processing of data that may be accomplished using such techniques. In some embodiments, such machine-learning techniques may be implemented automatically upon occurrence of certain events or upon certain conditions being met. Use of machine learning techniques, as described herein, may begin with training a machine learning program, or such techniques may begin with a previously trained machine learning program.

A processor or a processing element (e.g., mobile device 110, on-board computer 114, and/or server 104 of FIGS. 1 and 2) may be trained using supervised or unsupervised machine learning, and the machine learning program may employ a neural network, which may be a convolutional neural network, a deep learning neural network, or a combined learning module or program that learns in two or more fields or routes of interest. Machine learning may involve identifying and recognizing patterns in existing data (such as vehicle collisions being caused by the same thing repeatedly occurring at one or more hazardous routes or particular locations), in order to facilitate making predictions. Models may be created based upon example inputs of data in order to make valid and reliable predictions for novel inputs.

Additionally or alternatively, the machine learning programs may be trained by inputting sample data sets or certain data into the programs, such as mobile device, vehicle, or smart infrastructure sensor and/or control signal data, and other data discussed herein. The machine learning programs may utilize deep learning algorithms that are primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct or a preferred output. In unsupervised machine learning, the processing element may be required to find its own structure in unlabeled example inputs. In one embodiment, machine learning techniques may be used to extract the control signals generated by computer systems or sensors, and under what conditions those control signals were generated.

The machine learning programs may be trained with vehicle-mounted, home-mounted, and/or mobile device-mounted sensor data to identify certain customer activity, such as routine travel along one or more hazardous routes at certain times of day to determine whether a given type of vehicle collision (e.g., collision causing vehicle damage of a predetermined amount, or causing one or more pedestrian injuries) may be more likely than normal at a specific location, and/or monitoring vehicle behavior as the vehicle travels along the hazardous route, whether under self-control or manual control.

After training, machine learning programs (or information generated by such machine learning programs) may be used to evaluate additional data. Such training data may be related to past and/or historical vehicle collisions or near collisions gathered by smart vehicles, mobile device, or smart infrastructure, or other similar data to be analyzed or processed. The trained machine learning programs (or programs utilizing models, parameters, or other data produced through the training process) may then be used for determining, assessing, analyzing, predicting, estimating, evaluating, or otherwise processing new data not included in the training data. Such new or additional data may be related to current, up-to-date, or near real-time vehicle collisions or near collisions gathered by smart vehicles, mobile device, smart infrastructure, or other sensors and cameras, or other similar data to be analyzed or processed. Such trained machine learning programs may, thus, be used to perform part or all of the analytical functions of the methods described elsewhere herein.

All of the foregoing methods discussed herein may be include additional, less, or alternate actions, including those discussed elsewhere herein. All of the foregoing methods may be implemented via one or more local or remote processors, transceivers, servers, and/or sensors, and/or via computer-executable instructions stored on computer-readable medium or media. The foregoing devices and systems may also include additional, less, or alternate functionality, including that discussed elsewhere herein.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method, carried out by one or more processors, of providing near real-time route safety information, the method comprising:
   receiving, by the one or more processors, a request for a desired destination for vehicular travel;
   accessing, by the one or more processors, historical route data for a plurality of potential travel routes to arrive at the desired location, the historical route data corresponding to one or more comparable areas near the plurality of potential travel routes;
   accessing, by the one or more processors, near real-time route data for the plurality of potential travel routes;
   determining, by the one or more processors, a risk index, wherein the risk index is a comparison result of the historical route data and the near real-time route data and is representative of how prone the one or more comparable areas are to collisions; and
   presenting, by the one or more processors, at least one travel route for the vehicle based on the calculated risk index.

2. The method of claim 1, further comprising:
   selecting, by the one or more processors, a desired travel route from the at least one presented travel routes; and
   presenting, by the one or more processors, the desired travel route to a device to facilitate routing of the vehicle according to the selected travel route, wherein the device comprises at least one of a mobile device, an on-board computer, or a navigator.

3. The method of claim 2, further comprising:
   periodically accessing, by the one or more processors, the near real-time route data for the selected desired travel route;
   calculating, by the one or more processors, an updated risk index based on the historical route data and the near real-time route data for the selected desired travel route; and
   presenting, by the one or more processors, updated risk information for the selected desired travel route.

4. The method of claim 1, further comprising transmitting, via a transceiver and via wireless communication or data transmission over one or more radio frequency links or wireless communication channels, the selected travel route to a device to facilitate routing of the vehicle according to the selected travel route, wherein the device comprises at least one of a mobile device, an on-board computer, or a navigator.

5. The method of claim 1, wherein the historical route data comprises at least one of historical traffic data, historical accident data, and neighborhood data.

6. The method of claim 1, wherein the near real-time route data comprises at least one of near real-time traffic data, near real-time road engineering data, and near real-time incident data.

7. The method of claim 1, wherein the vehicle comprises at least one of an automobile, a self-powered machine, and a manually-powered machine.

8. A server configured to reduce vehicle collisions, the server comprising:
   a memory configured to store non-transitory computer executable instructions; and
   a processor configured to interface with the memory, wherein the processor is configured to execute the non-transitory computer executable instructions to cause the processor to:
   receive a desired destination input for vehicular travel;
   access historical route data for a plurality of potential travel routes to arrive at the desired location, the historical route data corresponding to one or more comparable areas near the plurality of potential travel routes;
   access near real-time route data for the plurality of potential travel routes;
   calculate a risk index, wherein the risk index is a comparison result of the historical route data and the near real-time route data and is representative of how prone the one or more comparable areas are to collisions; and present at least one travel route for the vehicle based on the calculated risk index.

9. The server of claim 8, wherein the processor is further configured to:
   select a desired travel route from the at least one presented travel routes; and
   present at least one travel route for the vehicle based on the calculated risk index.

10. The server of claim 9, wherein the processor is further configured to:
    periodically access the near real-time route data for the selected desired travel route;
    calculate an updated risk index based on the historical route data and the near real-time route data for the selected desired travel route; and
    present updated risk information for the selected desired travel route.

11. The server of claim 8, further comprising:
    a transceiver coupled to the processor, the transceiver configured to communicate via a wireless communication or data transmission over one or more radio frequency links or wireless communication channels, wherein the transceiver is configured to transmit the selected travel route to a device to facilitate routing of the vehicle according to the selected travel route;
    wherein the device comprises at least one of a mobile device, an on-board computer, or a navigator.

12. The server of claim 8, wherein the historical route data comprises at least one of historical traffic data, historical accident data, and neighborhood data.

13. The server of claim 8, wherein the near real-time route data comprises at least one of near real-time traffic data, near real-time road engineering data, and near real-time incident data.

14. The server of claim 8, wherein the vehicle comprises at least one of an automobile, a self-powered machine, and a manually-powered machine.

15. A non-transitory computer readable medium containing a set of computer readable instructions for reducing vehicle collisions that when executed by a processor configure the processor to:
    receive a desired destination for vehicular travel;
    access historical route data for a plurality of potential travel routes to arrive at the desired location, the historical route data corresponding to one or more comparable areas near the plurality of potential travel routes;
    access near real-time route data for the plurality of potential travel routes;
    calculate a risk index, wherein the risk index is a comparison result of the historical route data and the near real-time route data and is representative of how prone the one or more comparable areas are to collisions; and
    present at least one travel route for the vehicle based on the calculated risk index.

16. The non-transitory computer readable medium of claim 15, wherein the processor is further configured to
    select a desired travel route from the at least one presented travel routes; and
    present at least one travel route for the vehicle based on the calculated risk index.

17. The non-transitory computer readable medium of claim 15, wherein the processor is further configured to:
    periodically access the near real-time route data for the selected desired travel route;
    calculate an updated risk index based on the historical route data and the near real-time route data for the selected desired travel route; and
    present updated risk information for the selected desired travel route.

18. The non-transitory computer readable medium of claim 15, that when executed by a transceiver, configure the transceiver to:
    transmit the selected travel route to a device to facilitate routing of the vehicle according to the selected travel route;
    wherein the device comprises at least one of a mobile device, an on-board computer, or a navigator.

19. The non-transitory computer readable medium of claim 15, wherein the historical route data comprises at least one of historical traffic data, historical accident data, and neighborhood data.

20. The non-transitory computer readable medium of claim 15, wherein at least one of a number of expected collisions, a number of observed collisions, or a number of near real-time events occurring on the route contribute to the risk index.

* * * * *